United States Patent [19]

Matsubara

[11] Patent Number: 4,762,376
[45] Date of Patent: Aug. 9, 1988

[54] ANTI-SKID CONTROL SYSTEM FOR MOTOR VEHICLES OF THE TYPE SWITCHABLE BETWEEN TWO-WHEEL DRIVE (2WD) AND FOUR-WHEEL DRIVE (4WD)

[75] Inventor: Yuji Matsubara, Kazo, Japan

[73] Assignee: Akebono Brake Industry Co., Ltd., Japan

[21] Appl. No.: 32,341

[22] Filed: Mar. 31, 1987

| 4,592,599 | 6/1986 | Belart | 303/119 |
| 4,611,858 | 9/1986 | Belart | 303/111 X |
| 4,657,310 | 4/1987 | Klein | 303/119 X |
| 4,718,515 | 1/1988 | Fanti et al. | 180/233 |

FOREIGN PATENT DOCUMENTS

| 0207395 | 1/1987 | European Pat. Off. | 303/111 |
| 2184181 | 6/1987 | United Kingdom | 303/100 |
| 2184182 | 6/1987 | United Kingdom | 303/100 |
| 2184183 | 6/1987 | United Kingdom | 303/100 |

*Primary Examiner*—Douglas C. Butler

[57] ABSTRACT

In an anti-skid control system for a motor vehicle of the type that the drive system thereof is switchable between two-wheel drive (2WD) and four-wheel drive (4WD), the design is so made that when the drive system for the motor vehicle is switched, the anti-skid control system is changed such that in 2WD condition, it is operated as a four-channel system wherein in the brake of the vehicle is controlled independently in the rear wheels thereof in accordance with the operation of the wheel speeds, while under a 4WD condition the anti-skid control system is operated as a cross-type select-low system wherein the wheel diagonally located is controlled under the bias of the lower one of the two wheels respectively.

ANTI-SKID CONTROL SYSTEM FOR MOTOR VEHICLES OF THE TYPE SWITCHABLE BETWEEN TWO-WHEEL DRIVE (2WD) AND FOUR-WHEEL DRIVE (4WD)

BACKGROUND OF THE INVENTION

1. Field of the Invention:

This invention relates to an anti-skid control system for a motor vehicle of the type that the drive system thereof is switchable between two-wheel drive (referred to as 2WD hereinafter) and four-wheel drive (referred to as 4WD), and more particularly it pertains to such an anti-skid control system which is designed such that when the drive system of the motor vehicle is switched from 2WD to 4WD or vice versa, the anti-skid control is changed to be suitable for the type of the switched drive system.

2. Description of the Prior Art:

An anti-skid control system for a motor vehicle of the 2WD type such as, for example, the front-engine, front-drive type (referred to as FF type hereinafter) is usually of the three-channel type wherein the front wheels of the motor vehicle are controlled independently of each other while the rear wheels thereof are controlled on the basis of the lower one of the rear wheel velocities (referred to as "select low" hereinafter), so that the front wheels are permitted to rotate at normal speeds, while the rear wheels are intermittently braked and relieved. In the case where such a system is employed with a motor vehicle of the type that the drive system is switchable between 2WD and 4WD, however, when the drive system is changed from 2WD to 4WD, speed differences tend to occur between the front and rear axles of the motor vehicle because of the fact that all the wheels are coupled directly to each other during 4WD operation, so that due to such speed differences, the wheels are caused to interfere with each other; thus, the result is such that the anti-skid control system is prevented from working properly so that "jerky feeling" is produced and in a worse case the motor vehicle is caused to swerve so that the directional stability thereof is deteriorated.

SUMMARY OF THE INVENTION

Accordingly, it is an object of the present invention to provide an anti-skid control system for a motor vehicle of the type that the drive system is switchable between 2WD and 4WD, the anti-skid control system being designed such that when the drive system of the motor vehicle is switched from 2WD to 4WD or vice versa, the anti-skid control is changed so as to be suitable for the type of the switched drive system, thereby eliminating the aforementioned problems with the prior art.

Briefly stated, according to the present invention, there is provided an anti-skid control system which is designed such that when the drive system of the motor vehicle is switched from 4WD to 2WD or vice versa, the anti-skid control is also switched accordingly. More specifically, the anti-skid control system is arranged such that when the drive system of the motor vehicle is switched from 4WD to 2WD, the system operates as a three-channel type system wherein the front wheels of the motor vehicle are controlled independently of each other and the rear wheels are controlled on the basis of the lower one of the rear wheel speeds, while when the drive system is switched from 2WD to 4WD, the system operates as a cross-piping, two-channel type system wherein the wheels associated with a respective one of the two channels are controlled on the basis of the lower one of the wheel velocities, i.e. on the "select low" basis.

Other objects, features and advantages of the present invention will become apparent from the ensuing description taken in conjunction with the accompanying drawings.

DESCRIPTION OF THE PREFERRED EMBODIMENTS

Figure 1:
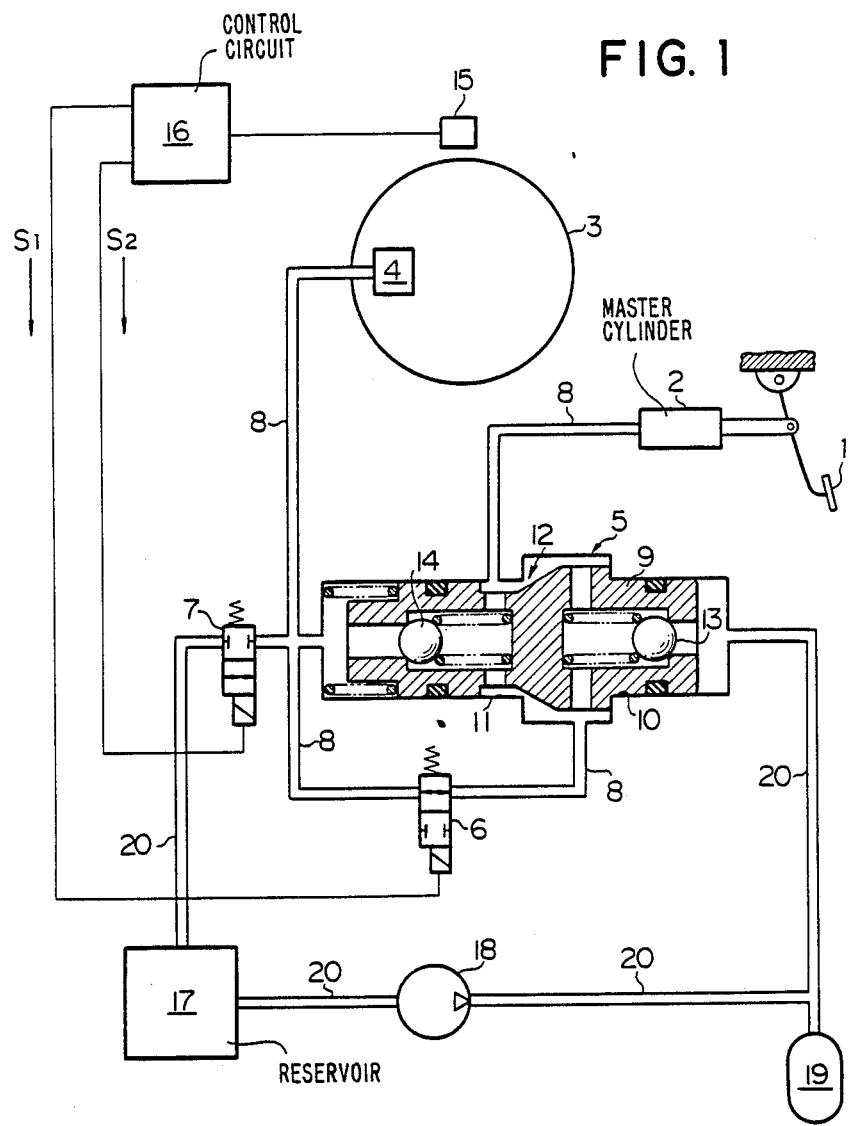
FIG. 1 is a schematic view illustrating an example of anti-skid control apparatus to which the present invention is applicable.

Referring to FIG. 1 of the accompanying drawings, there is schematically shown the arrangement of an example of anti-skid control brake apparatus to which the present invention is applicable, wherein the reference numeral 1 indicates the brake pedal; the reference numeral 2 shows a master cylinder; the reference numeral 3 indicates a wheel; the reference numeral 4 indicates a wheel cylinder of wheel brake device; the reference numeral 5 represents a gate valve device; the reference numeral 6 indicates a pressure increasing and holding electromagnetic valve device (referred to as pressure increasing valve hereinafter); the reference numeral 7 denotes a pressure reducing electromagnetic valve device (referred to as pressure reducing valve hereinafter); and the reference numeral 8 shows a main passageway which extends from the master cylinder 2 to the wheel cylinder 4 through the gate valve device 5 and pressure increasing valve 6 to transmit brake hydraulic pressure.

The aforementioned gate valve device 5 comprises cylinders 10 and 11 containing a piston 9 which is movable due to pressure difference. The gate valve device 5 is arranged such that when the piston 9 is moved due to pressure difference to the left as viewed in the drawing, the valve portion, indicated at 12, of the gate is closed so that the master cylinder side is hydraulically isolated from the wheel cylinder side. Indicated at 13 is a check valve, and shown at 14 is a relief valve.

A wheel speed detector 15 (referred to as speed sensor hereinafter) is provided, and a signal derived therefrom is inputted to a control circuit 16. Generally, the control circuit 16 may comprise a micro computer and which in this embodiment, may be constructed so as to perform control functions such as represented in the block diagram of FIG. 2 and provide either a brake pressure holding signal $S_1$ or a pressure reducing signal $S_2$ on the basis of a signal resulting from the detection by the speed sensor 15.

The aforementioned pressure increasing valve 6, which is of the normally-open type, is arranged to be closed in response to the hydraulic pressure holding signal $S_1$ derived from the control circuit 16 so that the above-mentioned main passageway 8 is interrupted and thus the hydraulic pressure is held. On the other hand, the pressure reducing valve 7, which is of the normally-closed type, is arranged to be opened in response to the pressure reducing signal S2 derived from the control circuit 16 so that hydraulic fluid contained in the wheel cylinder 4 is pumped up to an accumulator 19 through a reservoir 17 by means of a pump 18 and the pumped-up hydraulic fluid is returned through a by-pass line 20 to the portion between the gate valve 5 and the pressure increasing valve 6.

In the foregoing explanation, only the system associated with one of the wheels has been described for the sake of simplicity in illustration and explanation, but actually, a similar system is provided for each of the wheels, and the respective systems are associated with each other in such a unique manner as will be described hereinbelow.

Figure 2:
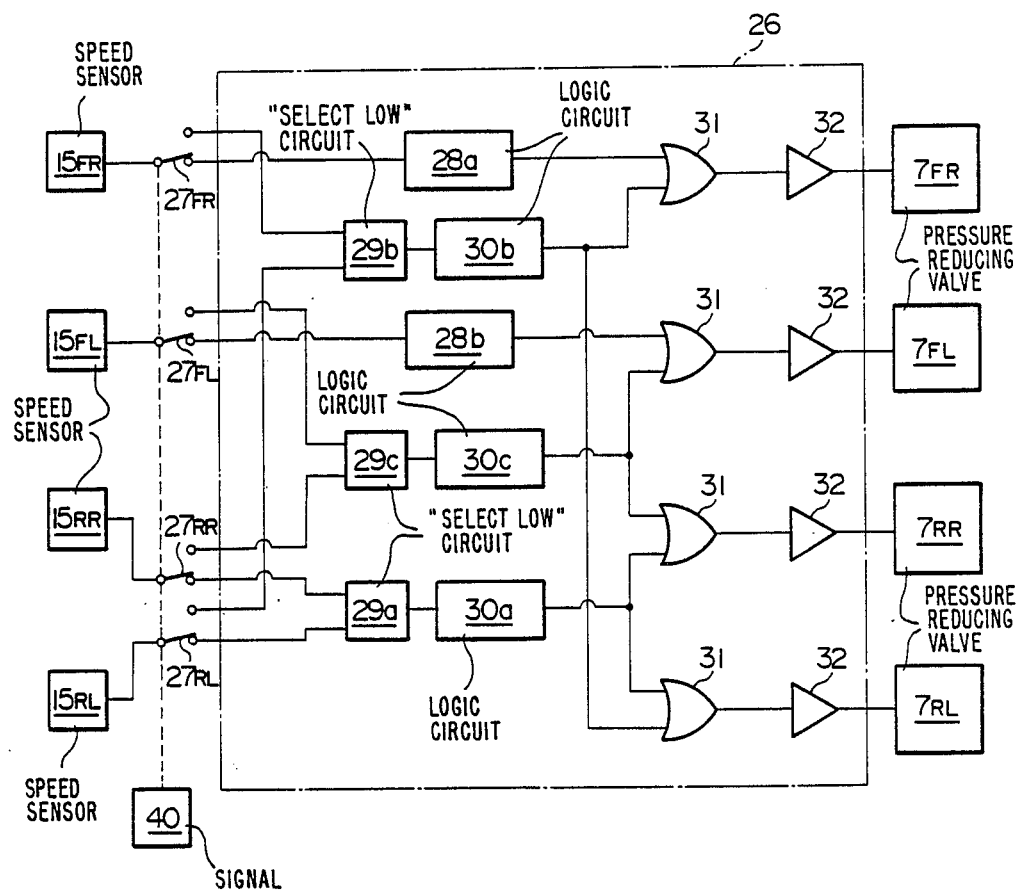
FIG. 2 is a block diagram showing the circuit arrangement according to an embodiment of the present invention.
Figure 3:
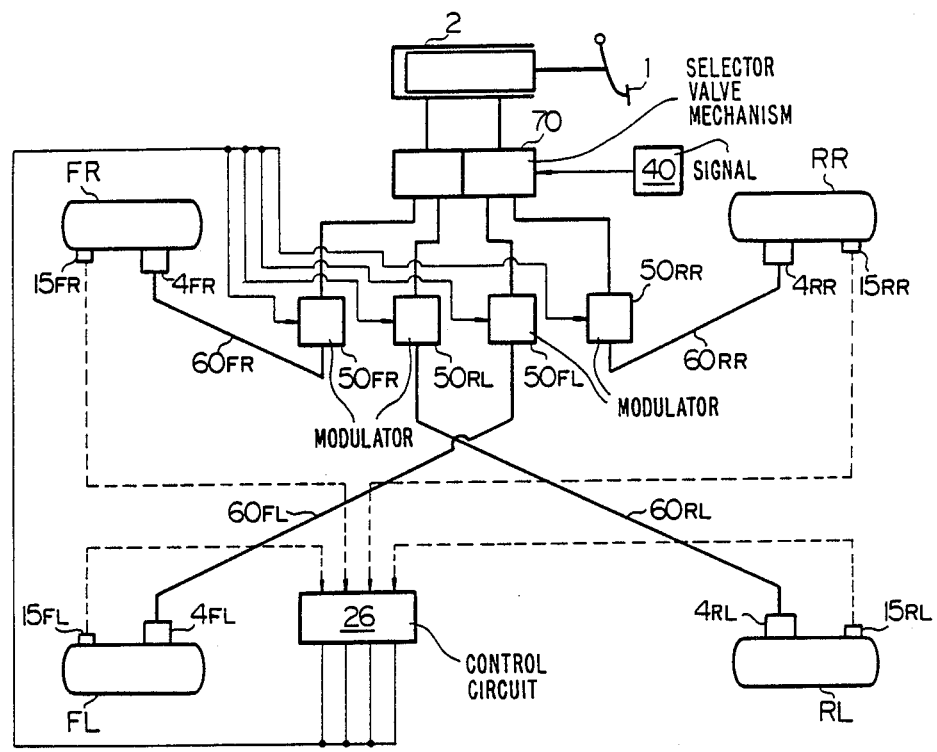
FIG. 3 is a view useful for explaining the piping arrangement of the anti-skid control brake apparatus embodying the present invention.

FIG. 2 is a block diagram illustrating an example of the circuit arrangement capable of working the anti-skid control system according to the present invention. FIG. 3 is a view useful for explaining the piping arrangement of a brake apparatus incorporating the system of the present invention. In FIGS. 2 and 3, parts corresponding to those of FIG. 1 are shown by like reference numerals; the letters FR, FL, RR and RL indicate the front righthand wheel, front lefthand wheel, rear righthand wheel and rear lefthand wheel, respectively; and the reference numerals with which such letters are combined as suffixes, indicate parts associated with the respective wheels, respectively.

In FIG. 2, speed sensors are indicated at $15_{FR}$, $15_{FL}$, $15_{RR}$ and $15_{RL}$, respectively, and pressure reducing (or pressure increasing) valves shown at $7_{FR}$, $7_{FL}$, $7_{RR}$ and $7_{RL}$, respectively. In FIG. 1, both the pressure increasing and pressure reducing valves were shown, but in FIG. 2, the pressure reducing or pressure increasing valves alone are shown for the sake of convenience in explanation. A control circuit 26 is provided which will be explained in detail hereinbelow.

According to the illustrated embodiment of the present invention, change-over switches $27_{FR}$, $27_{FL}$, $27_{RR}$ and $27_{RF}$ are interposed between the respective speed sensors $15_{FR}$ to $15_{RF}$ and the input side of the control circuit 26. It is particularly to be noted that when the drive system of the motor vehicle is switched from 2WD to 4WD, a signal is generated such as shown by a block 40, in response thereto, and each of the change-over switches $27_{FR}$ to $27_{RL}$ is switched, on the basis of the signal, from the lower contact position (2WD or FF position) to the upper contact position (4WD position), as viewed in the drawing, whereby the anti-skid control system per se is changed so as to be suitable for the type of the switched drive system.

Referring to FIG. 2, description will first be made of the connection between the respective change-over switches $27_{FR}$ to $27_{RL}$ and the respective elements of the control circuit 26. Under the illustrated condition where each of the change-over switches $27_{FR}$ to $27_{RL}$ assumes the 2WD (FF) position, the front righthand and lefthand wheel speed sensors $15_{FR}$ and $15_{FL}$ are connected to logic circuits 28a and 28b through the change-over switches $27_{FR}$ and $27_{FL}$, and the rear righthand and lefthand wheel speed sensors $15_{RR}$ and $15_{RL}$ are connected, through the change-over switches $27_{RR}$ and $27_{RL}$, to a circuit 29 adapted to select the lower one of the two wheel speeds (referred to as "select low" circuit hereinafter) and thence to a logic circuit 30a following the "select low" circuit 29. In FIG. 2, an OR gate is indicated at 31, and an amplifier circuit is denoted at 32.

As mentioned above, under the illustrated condition, i.e., under the 2WD (FF) condition, the front righthand and lefthand wheel speed sensors $15_{FR}$ and $15_{FL}$ are connected to their associated logic circuits 28a and 28b respectively while the rear righthand and lefthand wheel speed sensors $15_{RR}$ and $15_{RL}$ are coupled to the logic circuit 30a through the "select low" circuit 29; thus, a three-channel type system is established wherein the front wheels FR and FL are controlled independently while the rear wheels RR and RL are controlled on the basis of the lower one of the rear wheel speeds, i.e., on the "select low" basis.

Under such a condition, if the drive system of the motor vehicle is switched from 2WD to 4WD, then the respective change-over switches $27_{FR}$ to $27_{RL}$ will be switched in response thereto as mentioned above, so that the front righthand wheel speed sensor $15_{FR}$ and rear lefthand wheel speed sensor $15_{RL}$ will be connected to the series of a "select low" circuit 29 - logic circuit 30b and the front lefthand wheel speed sensor $15_{FL}$ and rear righthand wheel speed sensor $15_{RR}$ will be coupled to the series of a "select low" circuit 29c - logic circuit 30c. In this way, there will be established a cross or X-type two-channel system wherein the wheels associated each of the two channels are controlled on the basis of the lower one of the wheel speeds, i.e., on the "select low" basis.

With reference to FIG. 3, it will now be described how the hydraulic pressure piping system of the brake apparatus is controlled through the operation of the arrangement shown in FIG. 2. In FIG. 3, modulators $50_{FR}$, $50_{RL}$, $50_{FL}$ and $50_{RR}$, each of which includes a gate valve, pressure increasing valve, pressure reducing valve, etc. such as described hereinabove, are respectively coupled, through hydraulic pressure pipes $60_{FR}$, $60_{RL}$, $60_{FL}$ and $60_{RR}$, to wheel cylinders $4_{FR}$, $4_{RL}$, $4_{RR}$ of the brake apparatus associated with the front righthand wheel, rear lefthand wheel, front lefthand wheel and rear righthand wheel. These modulators $50_{FR}$, $50_{FL}$, $50_{RR}$ and $50_{RL}$ are arranged to be operated by the aforementioned control circuit 26 on the basis of signals derived from the speed sensors $15_{FR}$, $15_{FL}$, $15_{RR}$ and $15_{RL}$ respectively. These modulators are also connected to the master cylinder 2 through a suitable hydraulic piping, and a selector valve mechanism 70 which will be described hereinbelow. In this case, as shown in FIG. 3, it will be seen that the hydraulic fluid pipes $60_{FR}$, $60_{RL}$ and $60_{FL}$, $60_{RR}$ are arranged in the form of cross or X-type.

The aforementioned selector valve mechanism 70 is adapted, when the drive system of the motor vehicle is changed from 2WD to 4WD, to be changed over on the basis of a signal shown by a block 40 as in the case of FIG. 2. More specifically, the selector valve mechanism 70 is arranged such that under the condition that the change-over switches $27_{FR}$, $27_{FL}$, $27_{RR}$ and $27_{RL}$ assume the positions as shown in FIG. 2, i.e., under the 2WD (FF) condition, a three-channel piping system is established wherein the modulators $50_{FR}$ and $50_{FL}$ are independent of each other, instead of being coupled to each other, and only the modulators $50_{RL}$ and $50_{RR}$ are coupled to each other, while when the drive system of the motor vehicle is switched to 4WD, the selector valve mechanism 70 is changed over as mentioned above so that a cross or X-type two-channel piping system is established wherein the modulators $50_{FR}$ and $50_{RL}$ are coupled to each other and the modulators $50_{FL}$ and $50_{RR}$ are also coupled to ech other.

As will be appreciated from the above discussion, according to the present invention, when the drive system of the motor vehicle is under 2WD (FF) condition, anti-skid control is effected in the form of three-channel system wherein the front wheels are controlled independently while the rear wheels are controlled on the basis of the lower one of the rear wheel speeds, i.e., on the basis of "select low" basis; and when the drive system is switched from 2WD to 4WD, the anti-skid control system is thereupon changed to cross or X-type two-channel system, thereby making it possible to most effectively eliminate, with the simplified construction, the problems with the prior art such as "jerky feeling" and so forth referred to in the preamble portion of the present specification.

While the present invention has been illustrated and described with respect to specific embodiments thereof, it is to be understood that the present invention is by no means limited thereto but encompasses all changes and modifications which will become possible within the scope of the appended claims.

What is claimed is:

1. An anti-skid control apparatus for motor vehicles having a drive system which is switchable between a two-wheel drive and a four-wheel drive, comprising:

a first modulator for regulating a front lefthand wheel brake pressure;

a second modulator for regulating a front righthand wheel brake pressure;

a third modulator for regulating a rear lefthand wheel brake pressure;

a fourth modulator for regulating a rear righthand wheel brake pressure;

a plurality of speed sensors each adapted for detecting respective wheel speeds;

logic circuit means for providing brake pressure control signals, on the basis of output signals derived from said plurality of speed sensors, to said first to fourth modulators; and change-over switch means provided in a circuit connecting said plurality of speed sensors to said logic circuit means, said change-over switch means being adapted so that under a two-wheel drive condition, said first and second modulators are operated independently and said third and fourth modulators are operated in synchronism with each other while under a four-wheel drive condition, said first and fourth modulators are operated in synchronism with each other and said second and third modulators are operated in synchronism with each other.

2. An anti-skid control apparatus according to claim 1, further comprising a "select low" circuit provided between said logic circuit means and said change-over switch means, wherein under the two-wheel drive condition, the speed sensors associated with the two rear wheels are connected to said logic circuit means through said change-over switch means and said "select low" circuit.

3. An anti-skid control apparatus according to claim 2, further comprising a further "select low" circuit provided between said logic circuit means and said change-over switch means, wherein under the four-wheel drive condition, the speed sensors associated with the rear and front wheels disposed in diagonal relationship with each other, are connected to said logic circuit means through said change-over switch means and said "select low" circuit.

* * * * *